United States Patent [19]

Straus

[11] Patent Number: 5,313,280
[45] Date of Patent: May 17, 1994

[54] METHOD AND APPARATUS FOR TESTING CODEC DEVICES

[75] Inventor: Marvin J. Straus, Boulder, Colo.

[73] Assignee: U S WEST Advanced Technologies, Inc., Boulder, Colo.

[21] Appl. No.: 912,877

[22] Filed: Jul. 13, 1992

[51] Int. Cl.⁵ .................. H04N 17/02; H04N 17/04
[52] U.S. Cl. ........................... 348/181; 328/187; 328/188; 348/189
[58] Field of Search ............... 358/139, 10; 328/187, 328/188; 379/53; 382/17, 18; 371/27; H04N 17/02, 17/04

[56] References Cited

U.S. PATENT DOCUMENTS

| | | | |
|---|---|---|---|
| 4,479,146 | 10/1984 | Cohn | 358/10 |
| 4,724,484 | 2/1988 | Ward | 358/139 |
| 4,970,602 | 11/1990 | Yoshio | 358/341 |
| 5,051,827 | 9/1991 | Fairhurst | 358/141 |

Primary Examiner—James J. Groody
Assistant Examiner—Glenton B. Burgess
Attorney, Agent, or Firm—Timothy R. Schulte

[57] ABSTRACT

A video codec evaluation method and apparatus is provided that permits an objective evaluation of the performance of a codec. A plurality of motion graphics scenes, selected to test for specific motion artifacts, are stored on a video disc which is read by a video player and supplied to a codec under test. The evaluator views the graphic scenes as processed by the codec, on a monitor, and uses visual and audible scoring levels, that are incorporated on the disk, and associated with the graphic scene, to identify the onset or disappearance of motion artifacts and record a score for the test.

18 Claims, 6 Drawing Sheets

| IMAGE PERSISTENCE (BACKGROUND WHITE) | IMAGE PERSISTENCE (BACKGROUND BLACK) |
|---|---|
| IMAGE PERSISTENCE (BACKGROUND BLACK) | IMAGE PERSISTENCE (BACKGROUND WHITE) |

*FIGURE 11*

| (BACKGROUND WHITE) |
|---|
| (BACKGROUND BLACK) |

*FIGURE 12*

METHOD AND APPARATUS FOR TESTING CODEC DEVICES

TECHNICAL FIELD

This invention relates generally to methods and apparatus for determining the performance of video coder/decoder (codec) devices and more particularly to such methods and apparatus which permit the end user of such devices to readily score the performance of the codec without resort to expensive test equipment.

BACKGROUND OF THE INVENTION

A video codec is a well known device which includes a coder that converts analog video signals to compressed digital data for transmission to a remote location. The codec also includes a decoder that expands compressed digital data received from a remote location and converts the expanded digital data to analog video signals for display. Video codecs are used in a number of duplex application such as video teleconferencing (VTC) systems. Typically, the coder accomplishes the digital compression by implementing various coding algorithms. These algorithms remove redundant information in the video image in order to reduce signal bandwidth sufficiently to allow transmission to the remote location over a relatively low cost transport such as standard digital telephone circuits. A reversal of the coding process is employed by the decoder to reconstruct the original video image.

A typical television signal, when digitized, produces a data stream of about 100 to 150 megabits per second (Mbps) before compression. Compressed video data streams usually range from 56 kilobits per second (kbps) to 45 Mbps. The receiving codec expands or decompresses the digital signal, then converts it back to an analog video format for display.

The process of compressing and decompressing the signal introduces defects, called motion artifacts in the received video image. These artifacts are readily observable when the video signals are displayed. Such well known motion artifacts include (1) blocking, where the received video image has rectangular or checkerboard patterns not present in the original image; (2) blurring or smearing, where the received video image has lost edge detail present in the original; (3) image persistence, where an old or previous image remains on the monitor; (4) jerkiness, where the original smooth continuous motion is perceived as a series of snapshots.

For a given codec, higher compression ratios (lower transmission rates) will generally produce more noticeable motion artifacts. For example, when a signal is compressed to 56 kbps (a compression ratio of over 1000:1), the resulting motion artifacts are obvious to observers. At the lower compression ratio (about 3:1) that produces 45 Mbps transmission, most observers cannot detect the motion artifacts.

Video test equipment such as test signal generators, vector scopes, and waveform monitors are useful for evaluating the quality of analog video signals. However, they don't provide a good measure of motion artifacts produced by codecs. At the present time, no test equipment is available to provide an objective measure of a codec's performance; so subjective panel evaluations have been used.

In order to insure a certain quality of service it is desirable to have a method of objectively measuring the performance of codec since it is the critical component of digital video teleconferencing. Prior attempts to obtain a measure of the performance of the codec have not been entirely successful due to the complexity and attendant expense involved. For example, it has been proposed to use various motion graphics or recorded video scenes as the image to be compressed, and to compare individual pixels of the video image before and after being processed by the codec. See "Subjective and objective testing of video teleconferencing/videophone systems" by Schaphorst and Bodson; and "The development of objective video quality measures that emulate human perception" by Voran published in Proceedings of IEEE GLOBECOM '91 at pages 1771-1775 and 1776-1781 respectively.

SUMMARY OF THE INVENTION

With the foregoing in mind, it is an object of the present invention to provide a method and apparatus for testing codecs which avoids the need for expensive test equipments and which provides an objective measure of the performance of the codec through the use of motion graphics which contain an integrated yardstick or scoring criteria for measuring motion artifacts.

It is another object of the present invention to provide such a method which utilizes computer generated motion graphics or images which are designed to produce specific motion artifacts during the digital compression/decompression process and to include within the graphic an accompanying aural or visual yardstick which permits a viewer of the displayed image to objectively measure the performance of the image processing equipment by relating the yardstick to the appearance of motion artifacts in the displayed image or the time delay produced by the equipment in processing the video.

In accordance with the present invention a video codec evaluation method and apparatus is provided that permits an objective evaluation of the performance of a codec by a supplier or user of the codec. A plurality of motion graphics scenes, selected to test for specific motion artifacts, are stored on a video disc which is read by a video player and supplied to the codec under test. In a preferred embodiment of the invention the compressed video data at the output of a first codec is supplied over an appropriate transmission system to the video data input of a second codec where the data compressed by the first codec is expanded or decompressed by the second codec and displayed on a monitor. In a second embodiment, capable of carrying out the majority of the tests, a single codec is used for both encoding and decoding the video scene. During each test, a motion graphics scene from the video disc is transmitted through the codecs (or codec). The evaluator views the transmitted scenes on a monitor, and uses visual and audible scoring levels, that are incorporated on the disk, and associated with the graphic scene, to identify the onset or disappearance of motion artifacts. The tests can be used to compare different compression ratios for a codec, develop a history of a codec's performance, or to compare different models of codecs.

BRIEF DESCRIPTION OF THE DRAWINGS

These and other objects and advantages of the present invention will be more apparent from the following detailed description which should be read in conjunction with the drawings in which.

FIGS. and 2-9 and 11-12 are examples of motion graphics that are used to produce motion artifacts.

Figure 10:
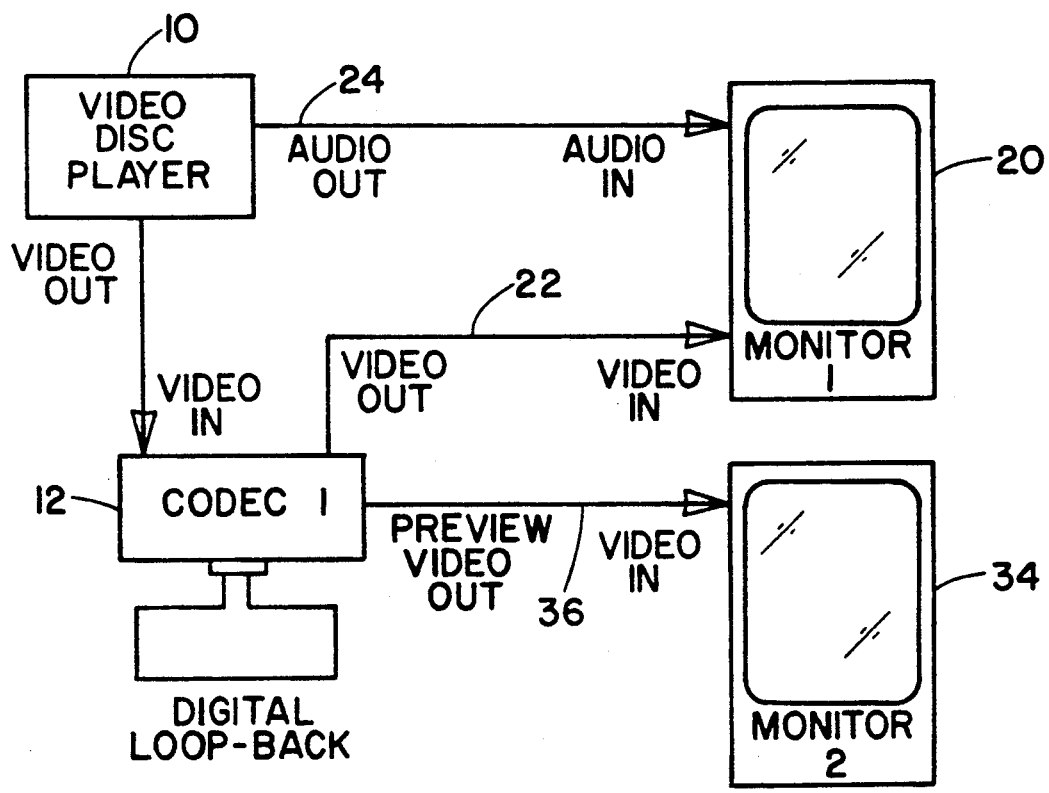

FIG. 10 is a block diagram of a second embodiment of the invention.

DESCRIPTION OF THE PREFERRED EMBODIMENT

Figure 1:
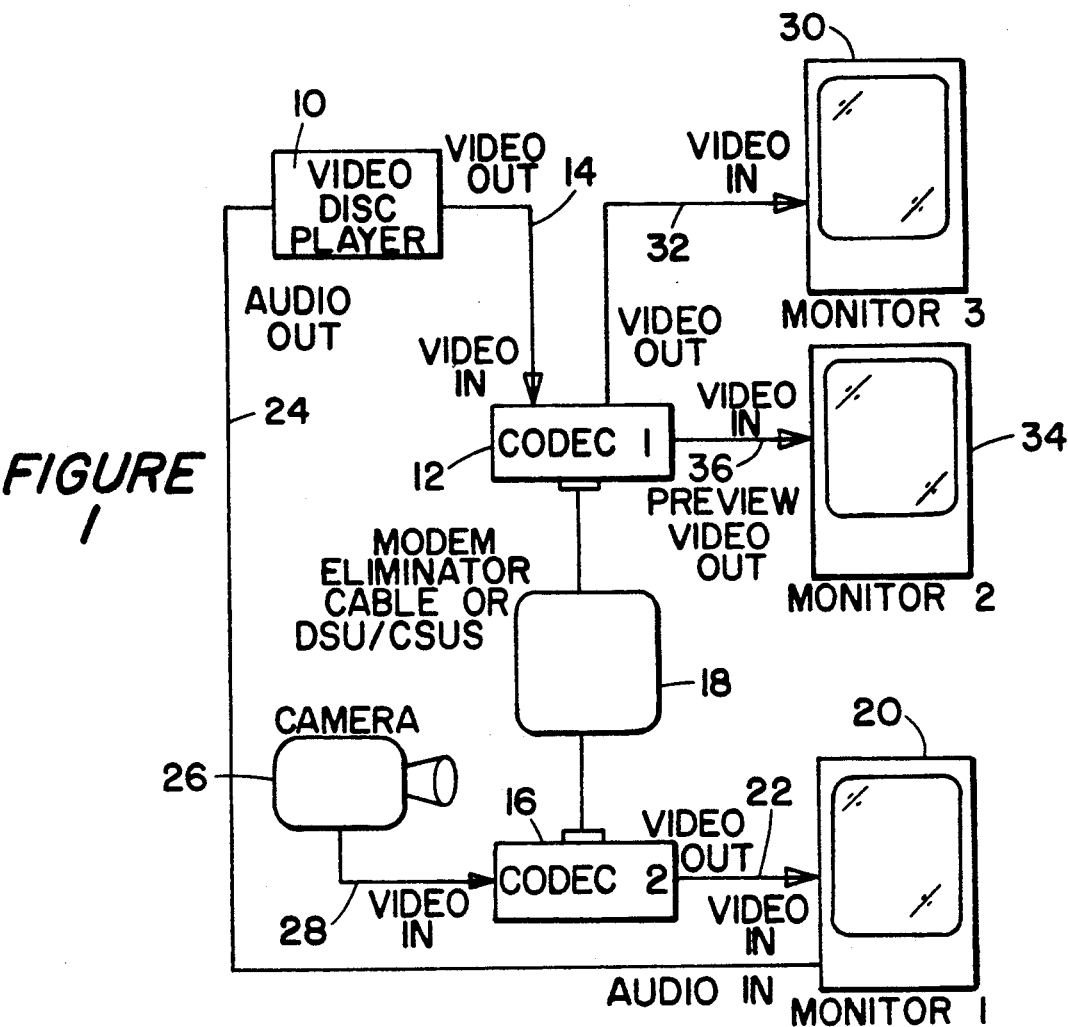
FIG. 1 is a block diagram of apparatus used in carrying out the method of the present invention.

Referring now to the drawings and initially to FIG. 1, the test apparatus of the present invention includes a video disk player 10 of conventional design which is adapted to receive a video disk and to provide video and audio output signals at appropriate output ports not shown. The motion graphics on the video disk appearing at the output of the video disk player 10 are provided as analog video input to a first codec 12 where the analog video is converted to digital signals and encoded. The video output of the disk player 10 is connected to the video input of codec 12 by means of an analog video cable 14. The digital output port of codec 12 is connected with the digital input port of codec 16 by means of a modem eliminator cable 18. Depending on the manufacturer of the codecs, a pair of DSU/CSUs and appropriate cabling, a pair of multiplexors and appropriate cabling or an active transmission system may be necessary or desirable to transmit the digital output signals from codec 12 to codec 16. Some codecs have an internal digital clock signal while others include an external source. When an external clock is used it may not be possible to use a modem eliminator cable to connect the codec's digital ports. The output of codec 16 is connected to the video input of monitor 20 through an analog video cable 22. The audio output of the video disk player 10 is connected with the audio input of monitor 20 by means of an audio cable 24.

A camera 26 provides a video input, over an analog video cable 28, to codec 16 and is intended to provide video signals for transmission to codec 12 as will be described more fully hereinafter in connection with certain of the tests to which the codecs are subjected. The video output of codec 12 is connected with the video input of a video monitor 30 by means of an analog video connector 32. Finally, a preview video output port of codec 12 is connected with the video input of a monitor 34 over an analog video cable 36 and presents the original un-encoded output of the video disk player 10 for viewing on monitor 34.

During the tests, motion graphics from the video disk player are transmitted as analog video to codec 12 where they are encoded. The original uncoded output of the video disk player is viewed on monitor 34. The encoded digital signal is transmitted to codec 16 where it is decoded. Finally, the decoded analog signal from codec 16 is displayed on monitor 20 where it is viewed by the tester or evaluator. One of the tests performed is a codec delay test which compares the video signal, which is delayed by processing in the codecs, to an audio signal which bypasses the codec. To support this test, the audio output of the disk player is connected with the audio input of the monitor 20 over the audio cable 24.

All of the tests to be performed on the codecs, with the exception of the processor capacity tests, measure the transmission quality of a signal from codec 12 to codec 16. The processor capacity tests evaluate the ability of the codecs to transmit video images with high motion content in two directions simultaneously. This test requires transmitting video from codec 16 to codec 12. The transmission from codec 16 to codec 12 may be either black or a high motion content scene. The black video source may be generated by a capped camera as indicated in FIG. 1 or by a test generator. The high motion content video may be generated by focusing the camera on a scene that displays high motion, for example, a zone plate generator or a bounce video test pattern. Monitor 30 is used to view the signal transmitted from codec 1 to codec 12.

Prior to performing the motion artifacts test to be hereinafter described, the monitors should be adjusted with reference to a standard signal. The reference signal may be from a signal generator or from a color bars graphic on the evaluation disk. If the evaluation disk is used to make the adjustments to the monitors, the video output of the disk player should be directly connected to the input of the monitor that is to be adjusted. After adjustment of the monitors, the disk player and monitor should be reconnected as shown in FIG. 1 in order to view the signal transmitted through the codecs.

During the tests, the room lights are preferably dimmed in the viewing area from the normal office level (about 100 foot candles) to approximately 70 foot candles to reduce glare and help avoid eye strain. If a light meter is not available, the lights should be adjusted to a comfortable viewing level. The direction of the room light relative to the monitor is important and should be positioned to avoid glare from the monitors screen. The area behind the monitor should be dimly lighted, but not dark.

There are four types of motion artifacts which are recognizable from the test to be performed on the codecs. These are (1) jerkiness—the presentation of motion video as a series of jerky movements or as a series of discrete snapshots. When jerkiness is noticeable, objects appear to jump from one location to the next in rapid small steps;

(2) blurring—the loss of fine detail or edge definition from the original scene. Blurring can be compared to viewing the scene through a rainy windshield;

(3) blocking—the appearance of small square or rectangular sections in the image, particularly in moving images. Sometimes only parts of the outlines of squares or rectangular regions are apparent. This motion artifact is sometimes described as "tiling";

(4) image persistence—the persistence of a previous image, or portions of it, after the scene has changed.

In most of the tests, the evaluator is asked to watch for the appearance (or disappearance) of only one motion artifact, and to ignore other defects, if they appear. The exception is the test of processor capacity. For processor capacity test, the evaluator watches for any one of the four motion artifacts.

Table 1 lists the thirteen tracks on the video disk which are used for seventeen different tests. The color wheel, rotating grid, blue/red wheel, and rotating egg test patterns consist of moving images. The motion speeds up or slows down steadily as each track is played. At constant intervals throughout the track, a numerical count is audible. The tests are scored by associating the numbered count last heard at the time when the motion artifact being tested becomes perceptible (or disappears).

TABLE 1

| Test | Test Pattern | Track | Tested Feature |
|---|---|---|---|
| 1 | color wheel (fast to slow) | 1 | disappearance of jerkiness |
| 2 | color wheel (slow to fast) | 2 | appearance of jerkiness |
| 3 | rotating grid (fast to slow) | 3 | disappearance of blurring |
| 4 | rotating grid (slow to fast) | 4 | appearance of blurring |
| 5 | rotating grid (fast to slow) | 3 | disappearance of jerkiness |
| 6 | rotating grid (slow to fast) | 4 | appearance of jerkiness |
| 7 | blue/red wheel (fast to slow) | 5 | disappearance of blocking |
| 8 | blue/red wheel (slow to fast) | 6 | appearance of blocking |
| 9 | rotating egg (fast to slow) | 7 | disappearance of blocking |
| 10 | rotating egg (slow to fast) | 8 | appearance of blocking |
| 11 | color wheel/ noise (noise increasing) | 12 | processor capacity (appearance of any motion artifact) |
| 12 | color wheel/ noise (noise decreasing) | 13 | processor capacity (disappearance of all motion artifacts) |
| 13 | random numbers (fast to slow) | 9 | image update |
| 14 | random numbers (slow to fast) | 10 | image update |
| 15 | clock (three speeds) | 11 | codec delay |
| 16 | image persistence | 12 | image persistence |
| 17 | color bars | 13 | color accuracy |

Figure 2:
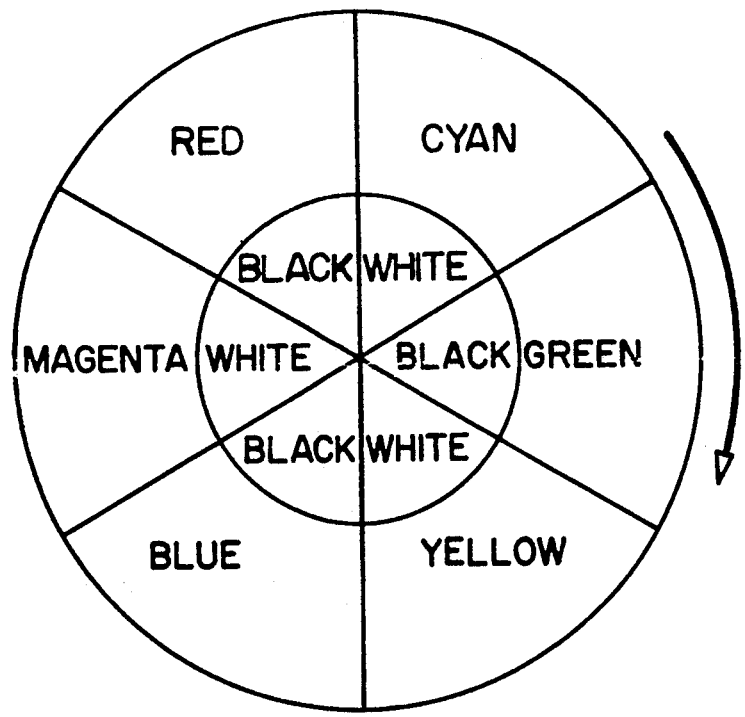

With respect to the tests outlined in Table 1, it is recommended that each pair of tests that use the same test pattern (fast to slow then slow to fast) be completed without a break and in the order given. The image graphic used in tests 1 and 2 on tracks 1 and 2 of the video disk is a color wheel shown in FIG. 2. Tests 1 and 2 utilize the rotating color wheel to test for the appearance of jerkiness in Test 1 and for the disappearance of jerkiness in Test 2. At the beginning of Test 1 the color wheel is rotated at its maximum rate. As the test progresses the rate of rotation gradually slows. The visual representation is accompanied by an audio count which starts at 30 and decreases numerically to 1. The current audio count, i.e. the last number heard prior to the disappearance of jerkiness, should be recorded as the score of this test.

At the beginning of test 2, the color wheel is stationary. As the test progresses, the color wheel begins to spin. The rotation gradually speeds up and the visual presentation is accompanied by an audio count which starts at 1 and proceeds to 30. The current audio count at the time jerkiness appears should be recorded as the test score. In both tests 1 and 2 blocking, blurring, or changes in color as well as jaggedness in moving lines should be ignored.

Figure 3:
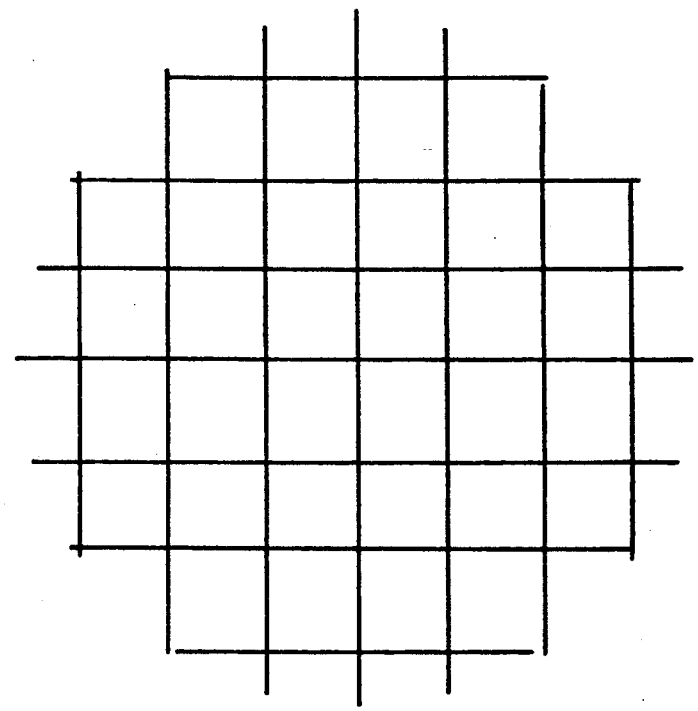

Tests 3 and 4 utilize a rotating white grid image graphic on a black background, shown in FIG. 3, to test for the disappearance and appearance of blurring which tests the ability of the codec to transmit a picture which preserves the fine detail of the original image. At the beginning of test 3, the grid is rotating at its maximum rate. As the test progresses, the rate of rotation gradually slows. The visual presentation is accompanied by an audio count which starts at 30 and counts down to 1. When blurring is no longer perceptible in the moving image, the current audio count should be recorded. At the beginning of test 4, the grid is stationary. As the test progresses the grid begins to spin. The rotation gradually speeds up accompanied by an audio count which starts at 1 and proceeds to 30. When blurring becomes perceptible in the moving image, the current audio count should be recorded as the score. In both test 3 and 4, blocking, jerkiness, or the appearance of color in the white areas of the image should be ignored. Also, jaggedness in moving lines that result from the image resolution capability of the monitor should be ignored.

In tests 5 and 6, the rotating grid of FIG. 3 is once again employed and in this instance to test for the disappearance and appearance of jerkiness as in test 1 and 2. At the beginning of test 5, the grid is rotating at its maximum rate. As the test progresses, the rate of rotation gradually slows. The visual presentation is accompanied by an audio count which starts at 30 and counts down to 1. At the moment jerkiness is no longer perceptible in the moving image, the current audio count should be recorded. At the beginning of test 6, the grid is stationary. As the test progresses the grid begins to spin. The rotation gradually speeds up accompanied by an audio count which starts at 1 and proceeds to 30. When jerkiness becomes perceptible in the moving image, the current audio count should be recorded as the score. In both test 5 and 6, blocking, blurring, or the appearance of color in the white areas of the image should be ignored. Also, jaggedness in moving lines that result from the image resolution capability of the monitor should be ignored.

Figure 4:
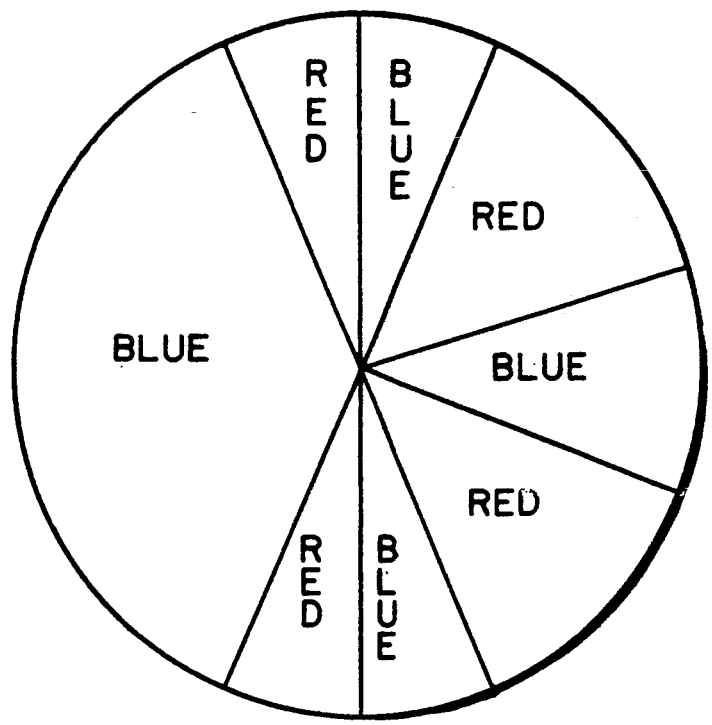

Tests 7 and 8 employ a blue/red wheel, shown in FIG. 4, to test for the disappearance and appearance respectively of blocking. As previously mentioned the blocking text measures the ability of the codec to transmit a moving picture without the appearance of processing blocks (tiling). At the beginning of test 7, the red and blue wheel is rotating at its maximum rate. As the test progresses, the rate of rotation gradually slows. The visual presentation is accompanied by an audio count which starts at 30 and decreases to 1. When blocking is no longer perceptible in the moving image, the current audio count is recorded as the score for this test. At the beginning of test 8, the red and blue wheel is stationary and as the test progresses the wheel begins to spin at increasing rates accompanied by an audio count that starts at and proceeds to 30. The current audio count when blocking appears should be recorded as the score. For tests 7 and 8, red patches in the blue part of the wheel or blue patches in the red part of the wheel indicate blocking. If only parts of blocks, particularly edges, appear, this should be counted as blocking. Blurring that may occur along the line that divides blue from red or around the perimeter of the wheel as well as any jerkiness should be ignored in tests 7 and 8.

Figure 5:
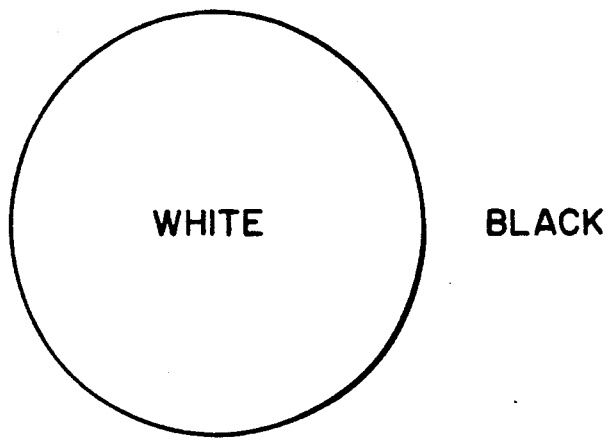

Tests 9 and 10 utilize a rotating egg graphic (ramp pattern), as shown in FIG. 5, to test for the disappearance and appearance of blocking respectively. The ramp pattern is produced from a video ramp signal. The video ramp signal is a linear transition of a television line signal that transitions from a 100 IRE (white) signal to a 0 IRE (black) signal. The ramp signal is rotated 360 degrees to produce the ramp pattern or egg graphic. The ramp pattern is then rotated to produce the motion graphic. At the beginning of test 9, the egg is rotating at its maximum rate. As the test progresses the rate of rotation gradually diminishes. The visual presentation is accompanied by an audio count that starts at 30 and decreases to 1. The current audio count when blocking disappears is the score for this test. At the beginning of test 10, the egg is stationary. As the test progresses the rate of rotation gradually increases. The visual presentation is accompanied by an audio count that starts at 1 and increases to 30. The current count when blocking appears should be recorded as the score. In tests 9 and 10 if only parts of blocks, particularly edges, appear, they should be counted as blocking. Any "water mark effect" which is a small wavy pattern distinct from the square "tiling" associated with blocking should be ignored as well as any jerkiness that appears in the displayed image.

Figure 6:
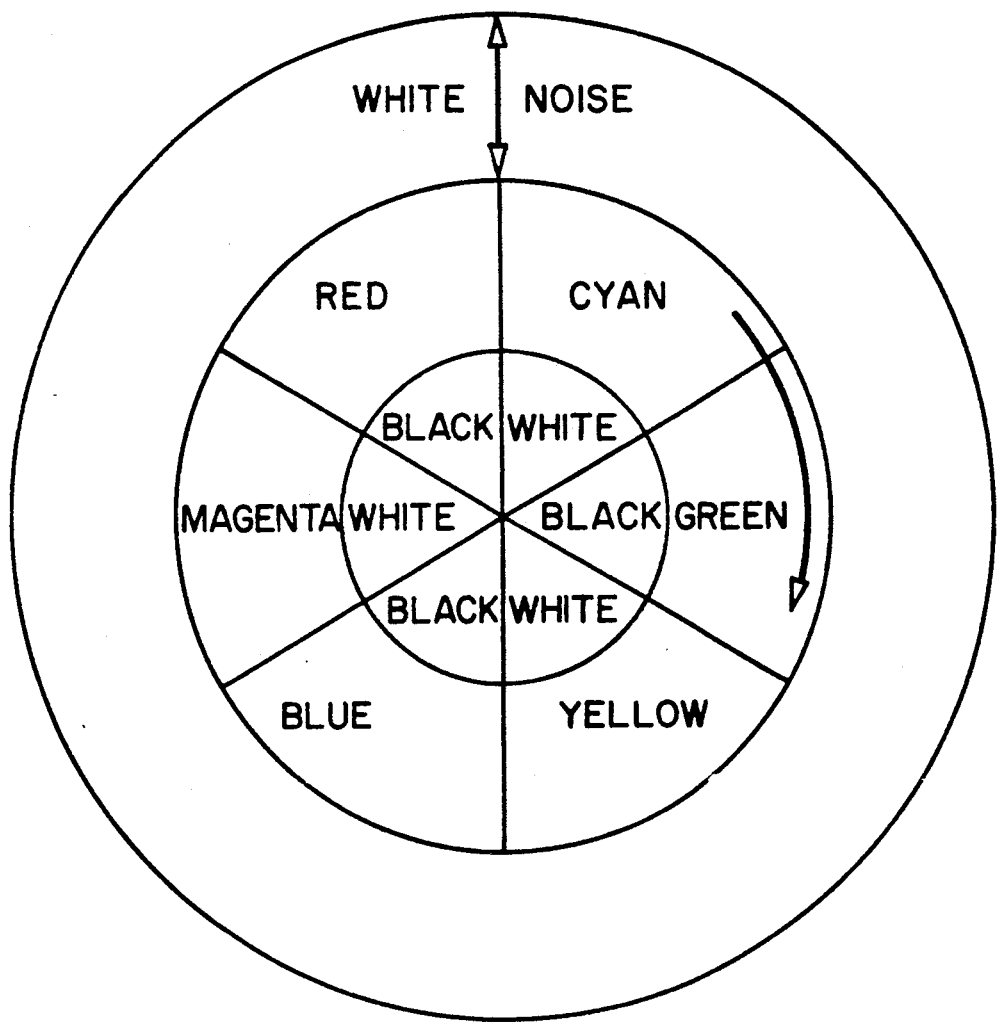

Tests 11 and 12 employ a color wheel with noise, shown in FIG. 6, in order to test the computational capabilities of the codec's processor and the robustness of the compression algorithm that the codec uses. Tests 11 and 12 should each be conducted twice. During the first run of each test, a black signal is transmitted from codec 16 to codec 12. During the second run of each test, a high motion content video image is transmitted from codec 16 to codec 12.

During both the first and second run of test 11, the color wheel rotates at a constant speed and as the test progresses more and more white noise (snow) is introduced into the test pattern in a ring around the color wheel as shown in FIG. 6. During the first run a black signal is transmitted from codec 16 to codec 12, to achieve bidirectional transmission in the conventional manner as in the video teleconferencing application, while in the second run a high motion content video image is transmitted from codec 16 to codec 12. The visual presentation is accompanied by an audio count that starts at 1 and increases to 30. The current count when a defect such as blocking, blurring or jerkiness occurs should be recorded as the score.

Test 12 reverses the amount of noise (snow) introduced over time. At the beginning of the test the color wheel rotates at a constant speed and the white noise (snow) is reduced from a maximum to a minimum. The visual presentation is accompanied by an audio count which starts at 1 and proceeds upward to 30. The current count when any defect (blocking, blurring or jerkiness) becomes apparent is recorded as the score. The second run of test 12 is carried out in the same way as the first run but with the high motion content image replacing the black signal. In both tests 11 and 12, any defects associated with the monitor such as jaggedness (straight lines that appear "stepped") or inaccurate color reproduction should be ignored. The current audio count number when all defects have disappeared is recorded as the score.

Figure 7:
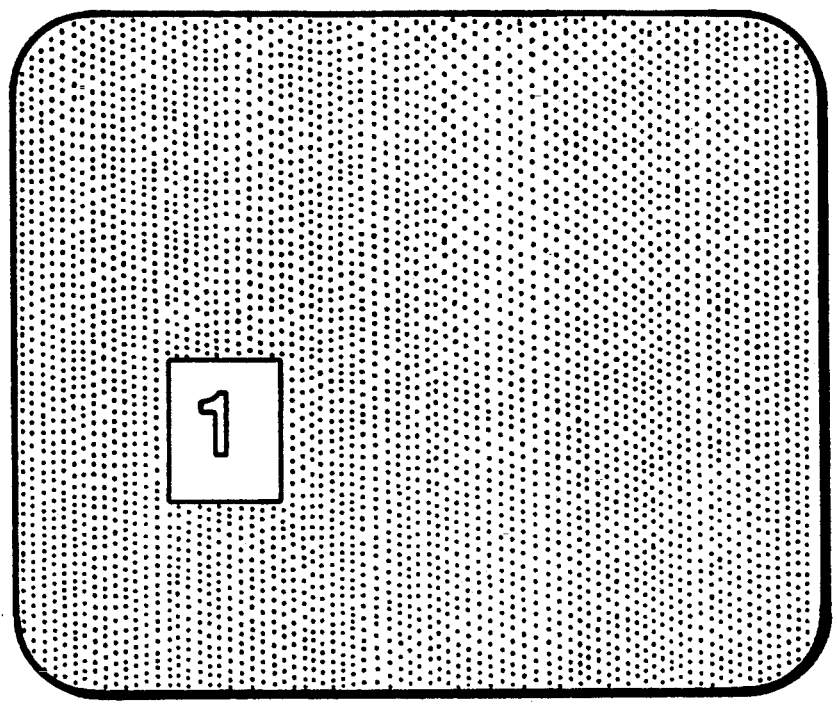

Tests 13 and 14 utilize random numbers, see FIG. 7, to test for image update i.e. the ability of the codec to deal with rapidly changing image content. In tests 13 and 14, the numbers from 1 to 10 appear across the bottom of the test pattern. The upper part of the pattern shows a background of noise. As the test progresses, each number (starting with 10 and counting down to 1 in test 13 and starting with 1 and counting up to 10 in test 14) disappear from the bottom of the pattern and are displayed for predefined time intervals in the upper part. Each number appears at a different location and the numbers as shifted from the bottom to the upper part of the display at four second intervals. In test 13, the number 10 is flashed for 1/7 second (four frames) against the background of noise at the top of the graphic. Succeeding numbers are flashed for longer intervals. The number 1 is flashed for four seconds. The highest number in a sequence of consecutive numbers that are visible represents the score for this test. For example, if the numbers 9, 6, 4, 3, 2 and 1 were visible, the score should be recorded as 4, which is the highest number in the consecutive sequence 1, 2, 3, 4. In test 14, the sequence of numbers is reversed and the random numbers are displayed in an increasingly slower time interval. The number 1 is flashed for four seconds against the background of noise and succeeding numbers are flashed for shorter intervals. The number 10 is flashed for 1/7 second. Once again, the highest number in a sequence of consecutive numbers represents the score for this test. All defects except failure to reproduce rapidly changing image content (flashing numbers) should be ignored. Also, the appearance and disappearance of numbers from the row of numbers at the bottom of the graphic should be ignored.

Figure 8:
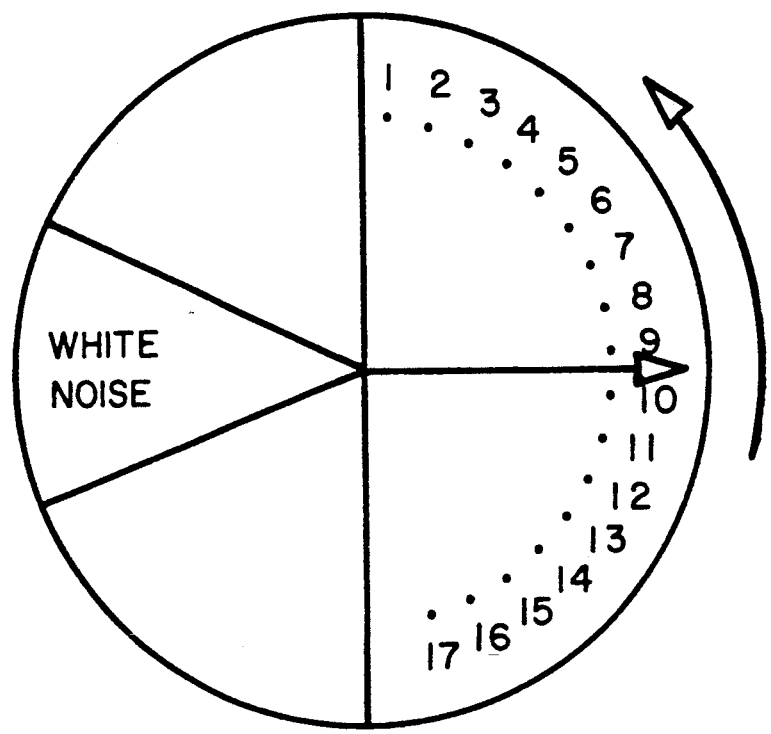

Test 15 measures the time required for coding and decoding the digital signal. The delay introduced by processing is generally not constant, but varies with the amount of motion present in the image. As shown in FIG. 1, the audio portion of the signal bypasses the codecs, while the video portion is processed. Test 15 measures the delay between an audio tone and a corresponding event in the video image. The image graphic or test pattern, shown in FIG. 8, is a clock hand which sweeps past numbers. The test is repeated at three different rates, two revolutions per minute (rpm), four rpm, and eight rpm. For each test, the position of the clock hand at the moment the audio beep is heard represents the score. All defects except the processing delay should be ignored. Compressed signals at transmission rates near or below 64 kbps, may exhibit jerkiness which may effect this test. If the clock hand appears to jump between two numbers at the time the beep is heard, the average of the two numbers should be used as the score. For example, if the clock hand jumps from three to two when the beep is heard, the score should be recorded as 2.5. The data for codec delay can be normalized to time. At 2 rpm, each unit on the clock is equal to 0.25 seconds; at 4 rpm, 0.125 seconds; and at 8 rpm, 0.0625 seconds.

Figure 9:
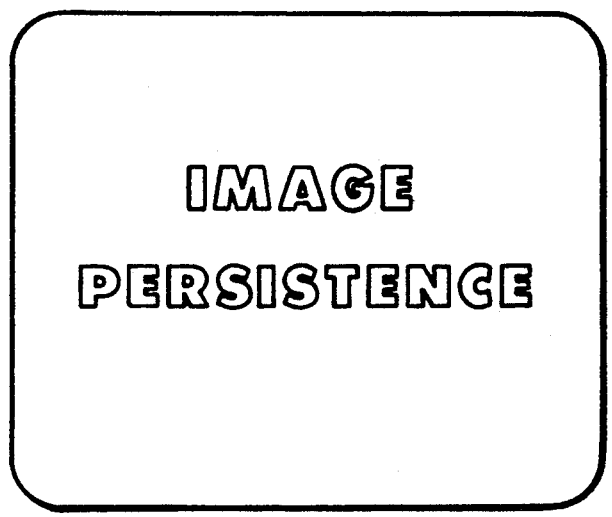

Test 16 measures the codec's ability to change rapidly from one scene to another without portions of the first scene remaining in the second one. The image graphic includes the words IMAGE PERSISTENCE as shown in FIG. 9, which is displayed for the first ten seconds of the test. Then the pattern changes abruptly to a white screen. When the scene changes, an audio count begins at 10 and counts down to 1. When all "ghosts" of IMAGE PERSISTENCE disappears the current audio count should be recorded as the score. Alternatively, the image graphic for testing image persistence may take the form of a rectangle containing four quadrants, each quadrants containing the text shown in FIG. 9. The upper left and lower right quadrants contain the black lettering IMAGE PERSISTENCE on a white background while the upper right and lower left quadrants contain the white lettering IMAGE PERSISTENCE on a black background. During the test the upper and lower left hand quadrants are switched ten times, as are the upper and lower right hand quadrants. After the switching is concluded the upper half of the rectangle provides a white background and the lower half presents a black background and an audible count begins at 10 and counts down to 1. Once again when all "ghosts" of IMAGE PERSISTENCE disappears the current audio count should be recorded as the score.

Referring now to FIG. 10, a second embodiment of the invention is shown in which a single codec is employed. In FIG. 10, the compressed data output of codec 12 is feedback through a digital loop-back to the compressed data input of codec 12. In other words, the output of the encoder of codec 12 is fed back to the decoder of the codec 12. All test previously discussed, except for the processor capacity test can be performed with the configuration of FIG. 10. During the tests, test pattern from the video disc player 10 is transmitted as analog video to codec 12 where it is encoded. The encoded digital signal is transmitted through the digital loop-back and decoded in codec 12. Finally, the decoded analog signal from codec 12 is displayed on monitor 20 and the audio output of the player 10 is fed to the audio input of the monitor 20.

Having thus described my invention, what I claim is:

1. A method of testing the ability of a codec to process data corresponding to a video scene that contains motion, comprising the steps of transmitting a test pattern which includes a moving video image of varying motion content and an accompanying audible scoring criteria, utilizing at least one codec for encoding and decoding the image, and displaying the image while concurrently reproducing the audible scoring criteria in order to provide a codec score at a time of occurrence of motion artifacts in a displayed image.

2. The method of claim 1 wherein the test pattern is a rotating graphic image which is rotated at a progressively changing rate from an initial rate to a final rate and is accompanied by an audible count which proceeds from an initial value to a final value, whereby the current count when applied to the appearance or disappearance of a motion artifact on the displayed image provides a score for the codec.

3. The method of claim 2 wherein the test pattern is a multi-colored wheel.

4. The method of claim 2 wherein the test pattern is a grid.

5. The method of claim 2 wherein the test pattern is substantially oval shaped.

6. The method of claim 1 wherein the test pattern is a multi-colored wheel that is rotated at a constant rotation rate and contains a ring of noise around the perimeter of the wheel which is varied in size from an initial value to a final value and is accompanied by an audible count which proceeds from an initial value to a final value, whereby the current count when applied to the appearance of disappearance of motion artifacts provides a score for the codec.

7. The method of claim 1 wherein the test pattern is a rotating graphic image at least a portion of which is rotated at a progressively changing rate from an initial rate to a final rate and is accompanied by an audible event which occurs at a predetermined point in the rotation of said portion of the image, whereby a time delay associated with the processing of the graphic image may be scored by recording the location of said portion of the image at the time of the audible event.

8. The method of claim 7 wherein said portion of said image is the hand of a clock sweeping past numerical indicia and wherein the audible event occurs when the hand reaches a predetermined one of said numerical indicia.

9. Apparatus for testing the performance of a codec comprising, playback means for reading audio and video signals from storage means and providing audio and video output signals, said storage means storing at least one test pattern of a motion graphic scene and an accompanying audible scoring criteria, codec means for processing said video output signals of said playback means, said codec means having a video input and a video output, means applying the video output signal of said playback means to the video input of said codec means, monitor means having audio and video inputs, means applying the video output of said codec means to the video input of said monitor means for displaying the video output of said codec means, means applying the audio output signal of said playback means to the audio input of said monitor means, whereby the production of motion artifacts during the processing of the test pattern may be correlated with a value from the scoring criteria.

10. The apparatus of claim 9 wherein said codec means include first and second codec devices, means applying the output of said first codec device to the input of said second codec device, said first codec device including first encoder means and first decoder means, said second codec device including second encoder means and second decoder means, means applying the output of said first encoder to the input of said second decoder and the output of said second encoder to the input of said first decoder, camera means providing a second test signal to a video input to said second encoder, second monitor means, means applying the output of said first decoder to the video input of said second monitor means.

11. The apparatus of claim 9 wherein said codec means includes an encoder and a decoder, digital loop-back means connecting the output of the encoder to the input of the decoder.

12. The apparatus of claim 9 wherein the test pattern is a rotating graphic image which is rotated at a progressively changing rate from an initial rate to a final rate over the time interval of the test and is accompanied by an audible count which proceeds from an initial value to a final value, whereby the current count when applied to the appearance or disappearance of a motion artifact provides a score for the codec.

13. The apparatus of claim 12 wherein the test pattern is a multi-colored wheel.

14. The apparatus of claim 12 wherein the test pattern is a grid.

15. The apparatus of claim 12 wherein the test pattern is substantially oval shaped.

16. The apparatus of claim 11 wherein the test pattern is a multi-colored wheel that is rotated at a constant rotation rate and contains a ring of noise around the perimeter of the wheel which is varied in size from an initial value to a final value over the time interval of the test and is accompanied by an audible count which proceeds from an initial value to a final value, whereby the current count when applied to the appearance or disappearance of motion artifacts provides a score for the codec.

17. The apparatus of claim 11 wherein the test pattern is a rotating graphic image at least a portion of which is rotated at a progressively changing rate from an initial rate to a final rate over the time interval of the test and is accompanied by an audible event which occurs at a predetermined point in the rotation of said portion of the image, whereby the time delay associated with the processing of the graphic image may be scored by recording the location of said portion of the image at the time of the audible event.

18. The method of claim 17 wherein said portion of said image is the hand of a clock sweeping past numerical indicia and wherein the audible event occurs when the hand reaches a predetermined one of said numerical indicia.

* * * * *